Aug. 9, 1932.　　　K. MAYBACH　　　1,870,341
CHANGE SPEED GEAR
Filed May 29, 1930
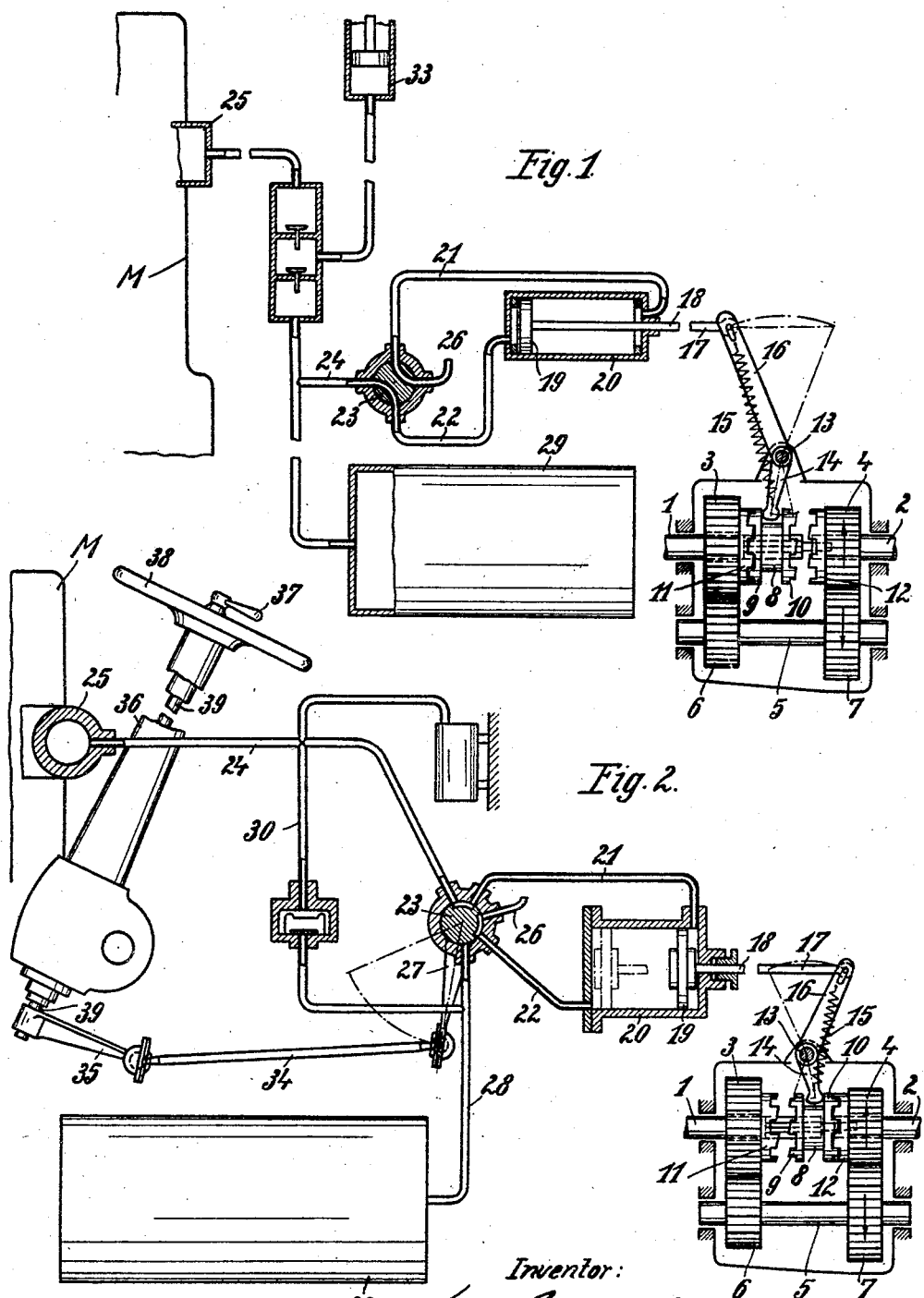
Inventor:
Karl Maybach Patented Aug. 9, 1932

1,870,341

UNITED STATES PATENT OFFICE

KARL MAYBACH, OF FRIEDRICHSHAFEN, GERMANY, ASSIGNOR TO MAYBACH-MOTOR-ENBAU G. M. B. H., OF FRIEDRICHSHAFEN, GERMANY

CHANGE SPEED GEAR

Application filed May 29, 1930, Serial No. 457,233, and in Germany June 15, 1929.

My invention relates to change speed gears and has special reference to gears of this kind as disclosed in my U. S. Patent 1,719,188. It is as well applicable to combination gears of any number of speeds in which my two-speed gear described in my U. S. patent is included.

The main object of my invention is simplification in operation of the speed gear, so as to make it easier for the driver to perfect the change in speed. Furthermore my invention helps him to avoid disadvantages which possibly might occur when perfecting the speed change under certain conditions.

There are other advantages connected with the application of my invention which will readily be seen when pointing it out in detail having reference to the drawing which represents examples embodying my invention.

Both figures are mere diagrams. In Fig. 1 the simplest way of construction embodying part of my invention is shown, whereas Fig. 2 represents the complete arrangement thereof.

The incoming shaft 1 is loosely surrounded by gear 3 meshing with gear 6 fixed to stub shaft 5. The right hand side of gear 3 is provided with teeth forming one half 11 of a claw coupling, the other half 9 of which is made integral with sleeve 8 splined to shaft 1. At its other end sleeve 8 again has teeth which form one half 10 of a second claw coupling, the other half 12 of which is provided at the left hand side of gear 4 fixed to outgoing shaft 2. This gear 4 meshes with gear 7 which is fixed to stub shaft 5. There is a lever and spring arrangement for operating the change in speeds comprising a lever 14 journaled at 13 the free end of which extends into a circular groove in sleeve 8, a second lever 16 also journaled at 13 and at its free end being connected to rod 17, and a spring 15 adapted on movement of lever 16 for example into its left hand position (shown in a dotted centre line in Fig. 2) to tension lever 14 and sleeve 8 toward the left. But as long as there is driving force between coupling half 10 and coupling half 12 these will not disconnect. But, as soon as the gas is turned off the motor, disengagement takes place and spring 15 causes sleeve 8 to move to the left bringing into touch with each other the two coupling halves 9 and 11. But these halves, because of the inclinations of the front faces of their teeth, will rattle past each other and not engage so long until half 9, formerly running faster than half 11,—because of the gear ratios chosen—begins to revolve slower than half 11. This will happen very soon, because shaft 1 connected to the motor and driving sleeve 8 will lose in speed of rotation quicker than shaft 2 connected to the vehicle and also in driving connection with gear 3 by means of gears 4, 7 and 6. This is due to the driving force being taken from the motor by taking the gas off and besides to the comparatively great momentum of the vehicle moving on and thereby now driving shaft 2 and gear 4. After this change in relative speed of revolution with halves 9 and 11 has taken place they will be in final engagement with each other, as shown in Fig. 1.

When swinging lever 16 from its position shown in Fig. 1 back to the right hand position the entire mechanism will work in an analogous manner as before. At first coupling halves 11 and 9 will not disconnect as long as there is driving force transmitted constantly from shaft 1 over sleeve 8 to gear 3. The result of the movement of lever 16 is simply the tensioning of spring 15 and of sleeve 8 toward the right hand position. But as soon as the gas is taken off the motor sleeve 8 will move to the right until coupling halves 10 and 12 come into touch with each other. Because of gear 4 revolving faster than sleeve 8 these coupling halves will not engage. But when the driver gives gas again the speed of rotation of shaft 1 and sleeve 8 increases immediately, soon after coupling half 10 has caught up half 12 and both halves will engage with each other. Then the position as represented in Fig. 2 is attained.

In the position of Fig. 1 outgoing shaft 2 is driven at higher speed of rotation than incoming shaft 1 because of the transmissions from gear 3 to gear 6 and from gear 7 to gear 4. But in the position shown in Fig. 2 these transmissions are ineffective so that their direct drive from shaft 1 to shaft 2 is in effect.

Instead of operating lever 16 by hand or foot, according to my invention, I provide a piston 19 moving within a cylinder 20 by means of air pressure, liquid pressure or the like, this piston working on lever 16 by means of rod 17—18. I prefer to use vacuum as means for moving piston 19, this vacuum being created in the motor intake indicated at 25 or by means of a special motor driven vacuum pump or the like 33. Both, the vacuum having its origin in the intake manifold and that resulting from the vacuum pump serve for evacuating a vacuum storage container 29 for the purpose of having disposable the necessary amount of vacuum in every desired moment independent from the degree of vacuum existing in the motor intake and from the size and performance of the vacuum pump.

For the purpose of controlling the vacuum in its influence on piston 19 a cock valve 23 is provided which may be turned in any well known manner so as to connect conduit 21 with conduit 24 and conduit 22 with conduit 26 opening into the open air, thus connecting the one side of cylinder 20 to the vacuum and its other side to the open air, or to connect conduits 21 and 26 and 22 to 24, respectively, thereby reversing the pressure conditions on piston 19 in cylinder 20 so that it will move to the other side thereof.

This operation of the cock valve may, as mentioned above, be effected in any well known manner, but according to my invention I prefer to have a small handle or lever 37 on the steering wheel 38 which by means of shaft 39 extending through the steering column 36 works together with lever 35 and rod 34, so that setting of this lever 37 serves for setting lever 27 connected to cock valve 23 in one of its two positions.

A further improvement is attained through my invention by providing the vacuum connections not as represented in Fig. 1 but as shown in Fig. 2, so that speed change from higher speed to lower speed is effected by the comparatively constant vacuum in the vacuum storage container whereas for speed change from lower speed to higher speed the variable vacuum of the motor intake is made use of.

This special arrangement has a considerable advantage, as will readily be seen from the following explanations:

Assuming the conditions are as shown in Fig. 2 and it is desired to change from direct drive to the higher speed, then the operation is as follows:

The driver, leaving the gas on and without disconnecting the main friction clutch, sets lever 37 and thereby turns the cock 23 to its other position in which it connects conduit 21 with 26 (open air) and at the same time also conduit 22 with 28. Thus the left hand side of cylinder 20 is connected to the vacuum storage container 29, and as the right hand side thereof is in connection with the atmosphere piston 19 will move towards the left and cause lever 16 to take the left hand position, the middle line of which is marked in dotted lines. Spring 15 now tends to draw lever 14 together with sleeve 8 to the left. But so long as there is gas on the motor, the side flanges of the teeth of coupling half 10 bear against the corresponding side flanges of the teeth of coupling half 12 as sleeve 8 is driving gear 4, and consequently the friction between these two coupling halves is too great as to allow for their disconnection. But as soon as the driver takes the gas off the motor, thereby withdrawing the driving force, the two coupling halves 10 and 12 disconnect and spring 15 instantly moves sleeve 8 to the left. The front faces of the teeth of coupling half 9 get into contact with those of coupling half 11, spring 15 tensioning these two halves toward engagement with each other. Because of the gear ratios chosen gear 4 runs faster than gear 3, and consequently sleeve 8, when coming out of engagement with gear 4 and approaching gear 3, is also running faster than gear 3. The front faces of the teeth of the two coupling halves 9 and 11 are so inclined that these halves will not engage but rattle past each other so long as half 9 is running faster than half 11. Because of the gas being turned off, the motor quickly loses in speed of rotation thereby causing sleeve 8 to rotate slower and slower. But gear 3 now driven not by the motor but by the vehicle from shaft 2 by means of gear 4, 7 and 6 loses its speed of rotation slower than sleeve 8, because of the comparatively great momentum of the on-moving car or vehicle. Consequently, within short time the relative movement of coupling halves 9 and 11 to each other is reversed and immediately after this reversion has taken place the two halves will engage because then the inclinations of the front faces of their teeth do not anymore throw them away from each other but the tension of spring 15 now is allowed to effect final engagement.

Thus when changing from direct drive to overspeed nothing is necessary for the driver to do but to set lever 37, to turn the gas off in the moment desired for the speed change and after a short moment, perhaps two seconds, to give gas again.

If, instead of using the vacuum of the storage container 29 for this speed change from slower to faster speed, the vacuum resulting from the motor intake were used, the following disadvantageous way of working would be the result: When setting the lever 37, at first nothing would happen, because the speed change being desired while the motor is running with open carburetor the vacuum in the intake does not suffice for moving piston 19 to the left. As soon as the driver turns the gas off the vacuum in the intake increases and now piston 19 is moved. At the same time a change in the driving conditions within coupling 10—12 takes place. Originally coupling half 10 drives half 12, but suddenly, by the gas being turned off, coupling half 12 now driven by the on-rolling vehicle drives half 10, so that now the car is driving the motor. This change is so sudden and takes such a short time that it is perfected before piston 19 has made its way from is right hand position to its left hand position. That is why the tension of spring 15 comes too late to cause disengagement between coupling halves 10 and 12, these being again under driving conditions before spring 15 tends to effect disconnection thereof. But as soon as the driver gives gas again and thereby causes a reverse change in the driving conditions between coupling halves 10 and 12, the spring 15 in the moment this change takes place draws the claws of half 10 out of those of half 12, as these claws or teeth are without a load just for this moment. Sleeve 8 is then drawn to the left so far until the front faces of coupling halves 9 and 11 come into touch. But as explained above, these two coupling halves cannot engage as long as half 9 is running faster than half 11 but will rattle past each other. For the purpose of attaining final engagement and working connection it is necessary for the driver to turn the gas off again for a short time period, so that spring 15 may cause the two halves to engage, as described above. Thereafter the driver may give gas again at his desire as the intended over-speed is now effective.

Thus, if the arrangement is not made according to my invention it is necessary to turn the gas off twice for the purpose of changing from the slower speed to the greater speed, whereas in the manner of my invention turning gas off once is sufficient. This means, of course, a considerable improvement.

Assuming now that the driver wants to change back from the greater speed to the slower speed; then the operation is as follows:

The driver re-sets lever 37 to the first position and thereby causes cock 23 to be turned back into the position originally shown in Fig. 2. Conduit 21 is again connected with conduit 24 and conduit 22 with conduit 26. The piston 19 is still in the left hand position represented in dotted lines and the vacuum of the intake 25 does not suffice for moving it because the change in speed is made while the motor is running at any desired high speed (without disconnecting the main friction clutch). So, at first, nothing will happen. But as soon as the driver turns the gas off the vacuum in the intake 25 increases and now causes the piston 19 to move to the right and to bring lever 16 back to its right hand position. This movement of piston 19 affords a certain time though, and before it is effected a change in the driving conditions between coupling halves 9 and 11 has taken place, half 9 then driving half 11 through the momentum of the on-rolling car. Therefore these halves are under load again and will at present not be caused to disconnect by the tension of spring 15. But as soon as the driver gives gas again and thereby causing the driving conditions between coupling halves 9 and 11 to be reversed again, sleeve 8 yielding to spring 15 moves to the right, coupling halves 9 and 11 disengage and coupling halves 10 and 12 with the front faces of their teeth get into touch. Because of the inclinations of these front faces and of the transmission ratio prevailing the two halves 10 and 12 at first will not engage, but rattle past each other, as gear 4 runs faster than gear 3 and than sleeve 8 just coming out of engagement with this latter gear. But before long sleeve 8, being in driving connection with shaft 1 driven by the motor, will catch up, because the driver has put the gas on again, and it will begin to overrun gear 4. Just a moment thereafter, when the two coupling halves 10 and 12 are still running almost at equal speed the tension of spring 15 will cause them to engage finally. Thus driving connection for the lower speed is perfected. Nothing is necessary for the driver but to set lever 37, to turn the gas off and to turn it on again.

If one would cause this change from the faster speed to the slower speed not by means of the vacuum from the motor intake but also through that from the vacuum storage container as with the speed change in the opposite sense, the result would be as follows: Setting of the lever 37 would by means of the constant vacuum from the container cause piston 19 together with lever 16 immediately to move into their right hand positions so that spring 15 tends to draw sleeve 8 also toward the right hand side. As soon as the driver turns the gas off coupling halves 9 and 11 are for a short moment without load during which they separate under the tension of spring 15. Consequently the front faces of the teeth of coupling halves 10 and 12 get into touch but rattle past each other because of the reasons stated above. This period of disengagement lasts so long as the driver does not turn the gas on again. Of course, as soon as the gas is turned on again coupling half 10 will soon overrun half 12 thereby causing final engagement between both halves.

The difference between this operation and the improved one according to my invention is, that with the improved manner clutch members 9 and 11 are engaged with each other during the period of the gas being turned off, whereas with the other manner of operation these members during this period are already disconnected and members 10 and 12 are not yet in final connection.

If my improvement is not applied it is possible that the motor may come to stop in case the driver out of some reason or other should not turn the gas on again, which for example might easily happen when riding down hill. Then the motor is not ready for being used for braking which would be desirable just in this case.

My invention does away with this disadvantage because then the motor is always in driving connection with the wheels of the car, except for a short moment during which, while giving gas, the sleeve 8 catches up with gear 4. But this disconnection will not occur at all in case the driver should omit to turn the gas on again. In this case sleeve 8 would stay connected to gear 3.

Thus it is necessary that the change from the slower speed to the faster speed be effected by means of the vacuum from the storage container whereas the opposite change should be caused by the vacuum from the intake of the motor.

I do not want to be limited to the details described or shown in the drawings, as many variations will occur to those skilled in the art.

What I claim is:

1. In a transmission mechanism of the type comprising a first rotatable member and a second rotatable member, means for rotating said first member at a speed different from that of the second member, but in the same direction and in constant speed ratio thereto; a slidable sleeve between said members adapted to be rotated independently thereof, clutch mechanism whereby said sleeve may be connected with either of said members, means whereby said sleeve is at all times tensioned toward one or the other of said members, means forming part of said clutch mechanism whereby when said sleeve leaves the more rapidly rotating member and moves to engage with the more slowly rotating member, said clutch mechanism will overrun and not engage so long as said sleeve is rotating more rapidly than such member, and similar means forming part of said clutch mechanism whereby when said sleeve leaves the more slowly rotating member and moves to engage with the more rapidly rotating member, said clutch mechanism will overrun and not engage so long as such member is rotating more rapidly than the sleeve; means for operating said sleeve; tensioning means comprising a cylinder, a piston therein, and two different vacuum containing receptacles, conduits connecting one end of said cylinder to one of said vacuum receptacles, other conduits connecting the other end of said cylinder to the other one of said vacuum receptacles, and vacuum control means connected to said conduits and adapted for alternately connecting one or the other cylinder side to its respective vacuum receptacle.

2. A transmission mechanism as claimed in claim 1 further characterized in that the two vacuum containing receptacles are the motor intake and a vacuum storage container and that the vacuum control means connected to said conduits is so designed that the change from the slower speed to the faster speed is effected by means of the vacuum from the storage container, whereas the change from the faster speed to the slower speed is caused by the vacuum from the motor intake.

KARL MAYBACH.